3,013,027
NEW STEROID COMPOUNDS AND PROCESS FOR THEIR MANUFACTURE

Leopold Ruzicka and Oskar Jeger, Zurich, Switzerland, assignors to Ciba Pharmaceutical Products Inc., Summit, N.J.
No Drawing. Filed Jan. 2, 1958, Ser. No. 706,580
Claims priority, application Switzerland Jan. 25, 1957
16 Claims. (Cl. 260—397.4)

This invention provides a process for irradiating steroid-dienes to produce new steroid compounds.

In the process of this invention a $\Delta^{1,4}$-3-keto-steroid of which the ring A has the formula

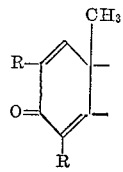

wherein each R is hydrogen or a lower aliphatic hydrocarbon radical is subjected to irradiation.

The irradiation is preferably carried out in an organic solvent, such as an alcohol, for example, methanol, ethanol, propanol, butanol, or an ether, for example, diethylether, dioxane, or a carboxylic acid, for example, acetic acid, propionic acid or butyric acid, in the presence or absence of water. As sources of light there may be used artificial or strong natural light. There is advantageously used ultra-violet light such as is produced by a high pressure mercury lamp, or strong sunlight. Usually the process is carried out at a temperature within the range of $-10°$ C. to $+150°$ C., but the reaction can be carried out at higher or lower temperatures, as it has been found that the choice of the temperature has less influence on the course of the reaction than the choice of the solvent and/or the period of irradiation. With short periods of irradiation ketonic reaction products are preferentially formed, and long periods of irradiation result almost exclusively in phenols. The irradiation products obtained apparently contain rings A and B having the following Formulae I to XVII:

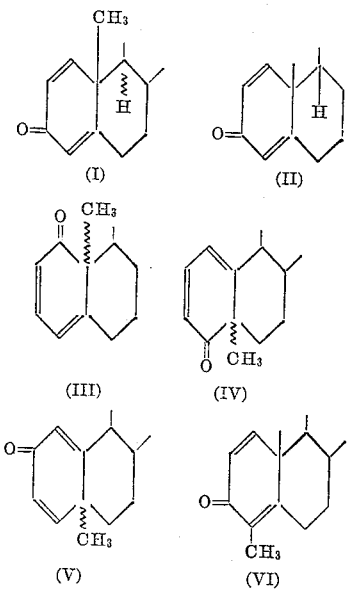

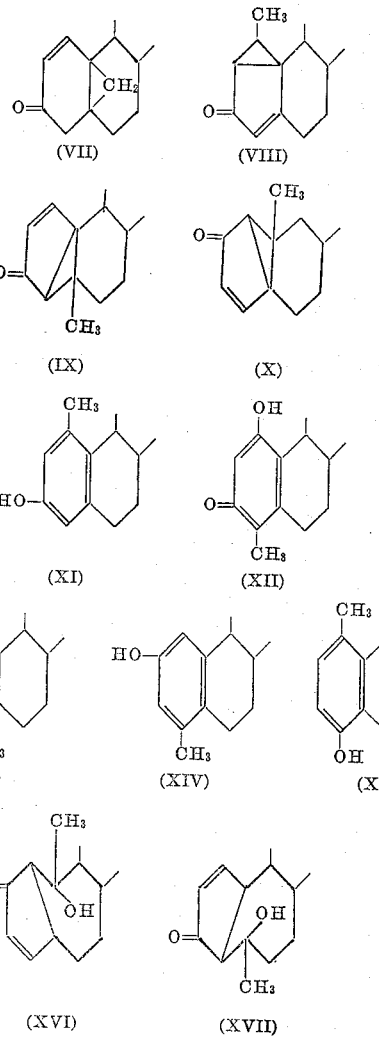

The $\Delta^{1,4}$-3-keto-steroids used as starting materials are derivatives of spirostane, furostane, cholane, cholestane, pregnane and androstane, and may be substituted, by any substituents, for example, in the rings C and D and in the side chain by free or functionally converted hydroxyl or oxo groups, such as acyloxy or alkoxy groups, or by halogen atoms, such as fluorine, chlorine or bromine, especially in the 9α- 12α- or 21-position, by acetalised oxo groups, and also by free or functionally converted carboxyl groups, such as nitrile or esterified carboxyl groups or by a lactone, for example, a butenolid, group. Specific starting materials are, for example, the following $\Delta^{1,4}$-3-keto-steroids: 1-dehydro-testosterone and esters thereof, 1-dehydro-testosterones containing a lower aliphatic hydrocarbon radical, for example, a methyl, ethyl, propyl, butyl, vinyl, ethinyl, allyl, propargyl or methallyl group in the 2-, 4-, 6- or 17α-position, 1-dehydro-compounds of cortisone, hydrocortisone, 11-epihydrocortisone, corticosterone, 11 - dehydrocorticosterone and the corresponding 9α- or 12α-fluoro, 9α- or 12α-chloro- and/or 16α-oxy-derivatives of aldosterone, cortexone, 17α-hydroxy- and 18-hydroxy-cortexone, progesterone and 11α-, 11β-hydroxy-, 11-keto-progesterone.

In the esters of the above mentioned starting materials the acyl groups are preferably those derived from lower fatty acids, such as acetic acid, propionic acid, butyric acid, trimethyl acetic acid.

The irradiation products of $\Delta^{1:4}$-3-keto-steroids obtained by the process of this invention are useful as medicaments or as intermediate products for making medicaments. Thus, the known 1-methyl-oestradiol obtained from 1-dehydro-testosterone acetate has a high oestrogenic action. The ketonic irradiation products obtained from 1-dehydro-testosterone derivatives are of special therapeutic interest owing to their high anabolic action and are useful as medicaments in treating diseases calling for medicaments having such action. The phenolic irradiation products obtained from 1-dehydrosterone possess anti-androgenic activity.

The following examples illustrate the invention:

EXAMPLE 1

3 grams of 1-dehydro-testosterone acetate are dissolved in 75 cc. or absolute dioxane, and the solution is irradiated in a cylindrical quartz vessel, which is provided with a cooling finger, at about 10° C. for 80 minutes by means of a high pressure quartz burner type Biosol Philips (250-W). The distance of the burner from the reaction vessel is about 10 centimetres. During the irradiation the solution is powerfully stirred with a magnetic stirrer. The solution is worked up by cautiously evaporating it to dryness under reduced pressure produced by a water jet pump at 20–30° C., and the residue is then dried overnight in a high vacuum at room temperature. In order to separate the neutral ketonic constituents from the phenols also formed in small quantity, the crude product is dissolved in a small amount (about 15 cc.) of benzene and the solution is filtered through a column of 90 grams of neutral aluminum oxide (activity II). A total of 2.45 grams of an oil is eluted from the column by means of 4 liters of benzene, and the residual phenolic substance amounting to about 0.5 gram is extracted with methanol (about 550 cc.).

In order to split up the products eluted with benzene they are dissolved in 6 cc. of a mixture of petroleum ether and benzene (1:1) and the solution is transferred to a column of 28 millimeters diameter of 200 grams of aluminum oxide of activity III, the column having been prepared with a mixture of petroleum ether and benzene (10:1).

*Ketone-B.*—By means of 2.8 liters of a mixture of petroleum ether and benzene, the relative proportions of these components being increased from 5:1 to 1:1, there are eluted 350 milligrams of crystals which melt between 145° C. and 155° C. After being recrystallized three times from a mixture of acetone and hexane (or a mixture of ether and pentane) this product melts at a constant temperature of 161–162° C., and it has the specific rotation $[\alpha]_D = -145°$ C. (c.=0.70). Its ultra-violet absorption spectrum exhibits a maximum at 238 m$\mu$, log $\epsilon$ 3.34, and end absorption at 207 m$\mu$, log $\epsilon$ 3.70, and absorption bands in the infra-red at 1739 (acetate), 1693 cm.$^{-1}$, 1669 cm.$^{-1}$, 1640 cm.$^{-1}$ and 1567 cm.$^{-1}$.

Analysis: $C_{21}H_{28}O_3$—Found C, 76.51%; H, 8.79%. Calculated C, 76.79%; H, 8.59%.

This compound is referred to as ketone-B and is probably $\Delta^1$-4:10-cyclo-3-oxo-5-methyl-17$\beta$-acetoxy-19-nor testene or $\Delta^3$-1:5-cyclo-2-oxo 17$\beta$-acetoxy-testene of the formulae

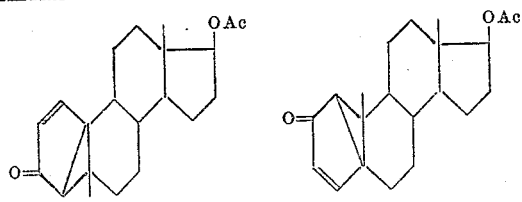

Upon hydrogenation with palladium charcoal (5%) in rectified spirit this ketone yields after the absorption of 1 mol of hydrogen dihydro-ketone-B melting at 164–165° C. after recrystallization from a mixture of acetone and hexane, and having the specific rotation $[\alpha]_D = +37°$ (c.=0.81). This compound exhibits in the ultra-violet absorption spectrum merely an end absorption at 212 m$\mu$, log $\epsilon$ 3.78. In the infra-red absorption spectrum it exhibits bands at 1730 cm.$^{-1}$ (acetate) and 1712 cm.$^{-1}$ (6-ring-ketone). The probable formula of dihydro-ketone-B (4:10-cyclo-3-oxo-5-methyl-17$\beta$-acetoxy-19-nor testane or 1:5-cyclo-2-oxo-17$\beta$-acetoxy-testane) is

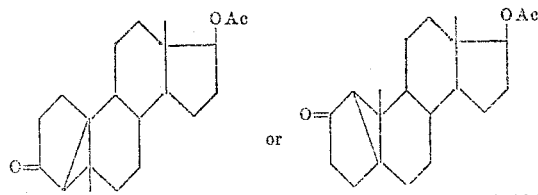

Analysis: $C_{21}H_{30}O_3$—Found C, 76.24%; H, 9.12%. Calculated C, 76.32%; H, 9.15%.

*Ketone-C.*—260 milligrams of crystals of crude material melting at 115–145° C. are then eluted with 800 cc. of a mixture of petroleum ether and benzene (1:1). After recrystallizing the crude product 4 times from a mixture of acetone and hexane (or a mixture of ether and pentane) its melting point rises to 161–162° C. Melting point tests upon a mixture of the latter product with ketone-B gave a depression of 45° C. It has the specific rotation $[\alpha]_D \epsilon = -141°$ (c.=0.54). It exhibits in the ultra-violet absorption spectrum a maximum at 242 m$\mu$, log $\epsilon$ 3.8, and the end absorption is at 207 m$\mu$, log $\epsilon$ 3.70. In the infra-red absorption spectrum it exhibits bands at 1738 cm.$^{-1}$ (acetate), 1693 and 1576 cm.$^{-1}$=chromophore system.

Analysis: $C_{21}H_{28}O_3$—Found C, 77.13%; H, 8.68%. Calculated C, 76.79%; H, 8.59%.

By catalytic hydrogenation of the ketone-C with palladium charcoal (5%) in rectified spirit a dihydro-derivative is obtained melting at 166–168° C. (after recrystallization from a mixture of acetone and hexane), which is apparently identical with dihydro-ketone-B.

According to mixed melting point tests and infra-red spectrum analysis ketone-C is different from ketone-B. When the depression occurring in the mixed melting point tests of the two dihydro-ketones-B and -C is not considered sufficient ketone-C must have a structure containing an $\alpha$:$\beta$-unsaturated CO-group and a 3-membered ring according to the formulae

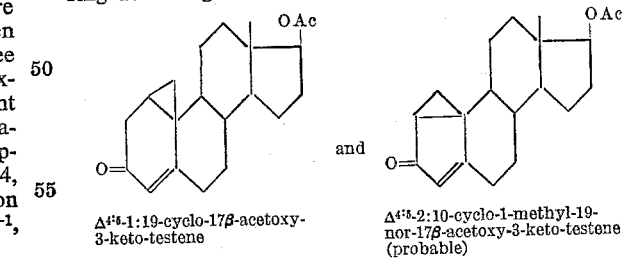

$\Delta^{4:6}$-1:19-cyclo-17$\beta$-acetoxy-3-keto-testene $\Delta^{4:8}$-2:10-cyclo-1-methyl-19-nor-17$\beta$-acetoxy-3-keto-testene (probable)

*Ketone-D.*—147 milligrams of an oil which up to now does not crystallize are eluted with 800 cc. of a mixture of petroleum ether and benzene (1:1). By similar tests carried out separately it is possible to obtain from this portion of the chromatogram crystalline ketone-D which melts at 174–175° C. after recrystallization from a mixture of acetone and hexane and has the specific rotation $[x]_D = +296°$ (c.=0.45). In the ultra-violet absorption spectrum ketone-D exhibits bands at 270 m$\mu$, log $\epsilon$ 3.56; 226 m$\mu$, log $\epsilon$ 3.81, and end absorption at 208 m$\mu$, log $\epsilon$ 4.08. It exhibits infra-red bands at 1734 cm.$^{-1}$ (acetate), 1686 cm.$^{-1}$, 1663 cm.$^{-1}$, 1612 cm.$^{-1}$ and 1588 cm.$^{-1}$=the chromophore system.

Analysis: $C_{21}H_{28}O_3$—Found C, 76.56%; H, 8.52%. Calculated C, 76.79%; H, 8.59%.

Catalytic hydrogenation of ketone-D, after the adsorption of 1 mol of hydrogen using palladium-charcoal 5 percent strength and rectified spirit, yields dihydro-ketone-D melting at 156–157° C. after recrystallization from a mixture of acetone and hexane, and having the specific rotation $[\alpha]_D = -49°$ (c.=0.27). Its ultra-violet absorption spectrum exhibits end absorption at 212 m$\mu$, log $\epsilon$ 3.68, and its infra-red absorption spectrum shows bands at 1725 cm.$^{-1}$ (acetate) and 1713 cm.$^{-1}$ (carbonyl in 6-ring).

*Ketone E.*—400 milligrams of crude crystals melting at 142–149° C. are obtained by eluting with 1.4 liters of a mixture of petroleum ether and benzene (1:1). After recrystallizing the product four times from a mixture of acetone and hexane its melting point rises to 157–158° C. and it has the specific rotation $[\alpha]_D = -15°$ (c.=0.65). Its ultra-violet absorption spectrum exhibits a band at 246 m$\mu$, log $\epsilon$ 4.26. Its infra-red absorption spectrum exhibits bands at 1731 cm.$^{-1}$ (acetate), 1705 cm.$^{-1}$, 1668 cm.$^{-1}$, 1618 cm.$^{-1}$ and 1535 cm.$^{-1}$=the chromophore system.

Analysis: $C_{21}H_{28}O_3$—Found C, 76.76%; H, 8.84%. Calculated C, 76.79%; H, 8.59%.

Reactions of ketone-E

Catalytic hydrogenation with palladium-charcoal of 5 percent strength in rectified spirit leads to the absorption of 2 mols of hydrogen, whereby a tetrahydro-ketone-E is obtained melting at 105–107° C. (after recrystallization from a mixture of acetone and hexane), and having the specific rotation $[\alpha]_D = +4°$ (c.=0.69). Its ultra-violet absorption spectrum exhibits no bands, and its infra-red absorption spectrum exhibits bands at 1728 cm.$^{-1}$ (acetate) and 1705 cm.$^{-1}$ (6-ring-ketone).

Tetrahydro-ketone-E is different from 17$\beta$-acetoxy-3-keto-testene and 17$\beta$-acetoxy-3-keto-androstene.

Analysis: $C_{21}H_{32}O_3$—Found C, 75.69%; H, 9.77%. Calculated C, 75.86%; H, 9.70%.

Isomerization with acetic anhydride-sulfuric acid 48 milligrams of ketone-E are dissolved hot in 0.8 cc. of acetic anhydride, and 0.4 cc. of acetic anhydride and 25 milligrams of concentrated sulfuric acid are added to the cold solution. After allowing the mixture to stand at room temperature for 4 hours it is worked up in the usual manner. By recrystallization twice from a mixture of acetone and hexane there are obtained 38 milligrams of crystals melting at 142–143° C. By melting point determination, mixed melting point tests and analysis it is the diacetate of phenol-K described in Example 3.

Analysis: $C_{23}H_{30}O_4$—Found C, 74.66%; H, 8.14%. Calculated C, 74.56%; H, 8.16%.

Ketone-E probably has one of the two formulae

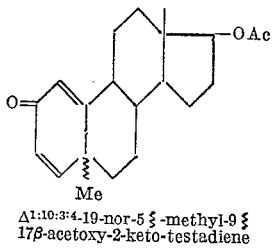
$\Delta^{1:10:3:4}$-19-nor-5$\xi$-methyl-9$\xi$ 17$\beta$-acetoxy-2-keto-testadiene

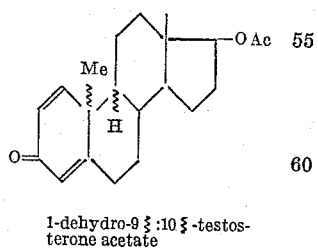
1-dehydro-9$\xi$:10$\xi$-testosterone acetate

In view of the fact that decomposition with ozone leads to a ring-B ketone the first of the above formulae appears to be the more probable.

By further elution with benzene only the starting material subjected to irradiation, namely $\Delta^1$-testosterone acetate, is obtained.

EXAMPLE 2

The starting mixture and the method of irradiation are analogous to those of Example 1, but the period of irradiation is 3 hours. After preliminary chromatography over 100 grams of aluminum oxide (activity II) there are obtained 1.7 grams of ketonic benzene eluates and 1.33 grams of phenolic methanol eluates. The ketones are chromatographed in the same manner as in Example 1.

*Ketone-B.*—Not detected.

*Ketone-C.*—68 milligrams.

*Ketone-F.*—This is eluted with a mixture of petroleum ether and benzene (1:1). There are obtained 80 milligrams of a crude product melting at 168–171° C. and after being recrystallized twice from a mixture of acetone and hexane 40 milligrams of a product are obtained melting at 174–175° C. (constant) and having the specific rotation $[\alpha]_D = +319°$ (c.=0.75). Its ultra-violet absorption spectrum exhibits bands at 268m$\mu$, log $\epsilon$ 3.62; 231m$\mu$, log $\epsilon$3.73; and 205m$\mu$, log $\epsilon$ 3.75. Its cm.$^{-1}$ (acetate), 1680 cm.$^{-1}$ and 1610 cm.$^{-1}$=the infra-red absorption spectrum exhibits bands at 1731 chromophore system. As shown by its infra-red absorption spectrum this compound is different from ketone-D.

Analysis: $C_{21}H_{28}O_3$—Found C, 75.83%; H, 8.63%. Calculated C, 76.79%; H, 8.59%.

By catalytic hydrogenation with palladium-charcoal (5 percent) in rectified spirit there is obtained a dihydro-ketone-F melting at 95–97° C. and having the specific rotation $[\alpha]_D = -5°$ (c.=0.65).

*Ketone-G.*—This compound is eluted with a mixture of petroleum ether and benzene (1:1). There are obtained 109 milligrams of a crude product melting at 134–142° C. After recrystallizing this product three times from a mixture of ether and pentane there are obtained 51 milligrams of a compound melting at 148–149° C. and having the specific rotation $[\alpha]_D = +256°$ (c.=0.85). Its ultra-violet absorption spectrum exhibits a maximum at 310m$\mu$, log $\epsilon$ 3.65 and an end absorption at 206 m$\mu$, log $\epsilon$ 4.02. Its infra-red absorption spectrum exhibits bands at 1736 cm.$^{-1}$ (acetate), 1657 cm.$^{-1}$ 1628 cm.$^{-1}$ and 1571 cm.$^{-1}$=the chromophore system.

Analysis: $C_{21}H_{28}O_3$—Found C, 76.95%; H, 8.41%. Calculated C, 76.79%; H, 8.59%.

By catalytic hydrogenation in the manner described above there is obtained after the absorption of 2 mols of hydrogen tetrahydro-ketone-G melting at 109–112° C. after recrystallization from pentane at −60° C. Its ultra-violet absorption spectrum exhibits no bands, and its infra-red absorption spectrum exhibits bands at 1736 cm.$^{-1}$ (acetate) and 1700 cm.$^{-1}$ (6-ring-ketone).

According to its spectroscopic properties and the results of hydrogenation ketone-G contains a homoannular chromophore of the formula

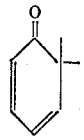

Accordingly, ketone-G may have either of the two structures given below

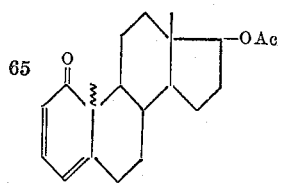
$\Delta^{2:4}$-9$\xi$:10$\xi$-17$\beta$-acetoxy-1-keto-testadiene

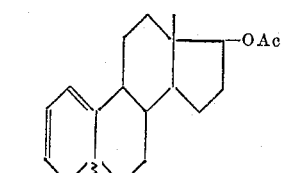
$\Delta^{1:10:2}$-9$\xi$-19-nor-5$\xi$-methyl-17$\beta$-acetoxy-4-keto-testadiene

*Ketone-E.*—Further elution yields 240 milligrams of crude ketone-E (see Example 1).

EXAMPLE 3

The starting mixture and conditions were the same as those described in Example 1, but the period of irradiation was extended to 9 hours. After being dried in a high vacuum, the reaction product isolated in the manner described in Example 1 is dissolved directly in benzene and transferred to a column of silica gel (180 grams, diameter 29 millimeters) and benzene evacuation before adding the silica gel in benzene).

The chromatogram was developed with 1.2 liters of benzene.

*Phenol-J-17-acetate.*—400 milligrams of crystals in crude form melting at 147–158° C. are eluted with 600 cc. of benzene, and recrystallization of the product 4 times from a mixture of acetone and hexane yields 239 milligrams of a compound melting at 170–171° C. and having the specific rotation $[\alpha]_D = +55°$ (c.=0.80). Its infra-red absorption spectrum exhibits bands at 1707 cm.$^{-1}$ (acetate band shifted owing to the hydrogen bridge), 1618 cm.$^{-1}$, 1588 cm.$^{-1}$ and 1503 cm.$^{-1}$.

Analysis: $C_{21}H_{28}O_3$—Found C, 76.79%; H, 8.68%. Calculated C, 76.79%; H, 8.59%.

Acetylation of phenol-J-17-acetate

After allowing the product to stand at room temperature in a mixture of pyridine and acetic anhydride overnight and working up in the usual manner there is obtained a crystalline diacetate in crude form melting at 149–150° C. After recrystallization three times from a mixture of acetone and hexane it melts at 150–151° C. and has the specific rotation $[\alpha]_D = +54°$ (c.=0.65). Its ultraviolet absorption spectrum exhibits a band at 268 m$\mu$, log $\epsilon$ 2.8 and its infra-red absorption spectrum exhibits bands at 1766 cm.$^{-1}$, 1729 cm.$^{-1}$ (phenolic and 17$\beta$-acetate), 1618 cm.$^{-1}$ and 1571 cm.$^{-1}$.

Analysis: $C_{23}H_{30}O_4$—Found C, 74.30%; H, 8.33%. Calculated C, 74.56%; H, 8.16%.

Probable formulae:

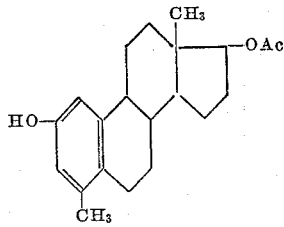

4-methyl-2-oxy-17$\beta$-acetoxy-oestratriene (1:3:5:10).

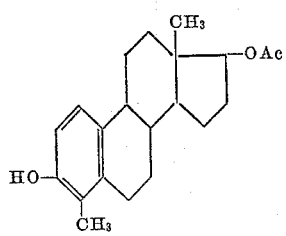

4-methyl-3-oxy-17$\beta$-acetoxy-oestratriene (1:3:5:10).

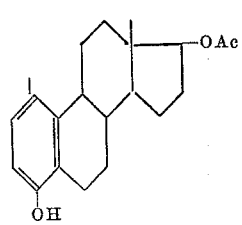

1-methyl-4-oxy-17$\beta$-acetoxy-oestratriene (1:3:5:10).

*4 - methyl - 1 - oxy - 17$\beta$ - acetoxy - oestratriene-(1:3:5:10), known.*—222 milligrams of crude 4-methyl-1-oxy-17$\beta$-acetoxy-oestratriene-(1:3:5:10) melting at 184–190° C. were then eluted with 300 cc. of benzene. After recrystallizing the product five times from a mixture of acetone and hexane there are obtained 122 milligrams of a compound melting at 194–195° C. and having the specific rotation $[\alpha]_D = +152°$ (0.78).

Analysis: $C_{21}H_{28}O_3$—Found C, 76.74%; H, 8.59%. Calculated C, 76.79%; H, 8.59%.

Acetylation of this product gives the known diacetate melting at 134–135° C. and having the specific rotation $[\alpha]_D = +143$ (c.=0.68). See Inhoffen, B. 74, 614 (1941).)

*1-methyl-oestradiol-17-acetate, known.*—637 milligrams of crystals in crude form melting at 170–173° C. are obtained with 1.5 liters of benzene. After recrystallizing the product three times from a mixture of acetone and hexane there are obtained 450 milligrams of a product melting at 175–176° C. and having the specific rotation $[\alpha]_D = +139°$ (c.=0.68).

Analysis: $C_{21}H_{28}O_3$—Found C, 76.73%; H, 8.57%. Calculated C, 76.79%; H, 8.59%.

When acetylated this product yields the known diacetate (see Dreiding, Journ. Am. Chem. Soc., 75, 3159 (1953)).

*Phenol-K-17-acetate.*—A further 99 milligrams of crystals melting at 198–200° C. are eluted with 1.2 liters of benzene. After recrystallization three times from a mixture of acetone and hexane there are obtained 58 milligrams of pure compound melting at 203–204° C. and having the specific rotation $[\alpha]_D = +39°$ (c.=0.68).

Analysis: $C_{21}H_{28}O_3$—Found C, 77.08%; H, 8.71%. Calculated C, 76.79%; H, 8.59%.

When this product is acetylated it yields a diacetate in crude form melting at 141–142° C. After being recrystallized three times from a mixture of acetone and hexane the melting point of the product does not increase. It has the specific rotation $$[\alpha]_D = +46° (c.=0.78)$$

Analysis: $C_{23}H_{30}O_4$—Found C, 74.66%; H, 8.17%. Calculated C, 74.56%; H, 8.16%.

The phenol-K-diacetate is obtained by isomerization from ketone-E (see Example 1).

For phenol-K there comes into consideration the same formulae as those for phenol-J.

EXAMPLE 4

2 grams of 1-dehydro-testosterone acetate, dissolved in 60 ml. of a 4:5 mixture of glacial acetic acid and water are heated to the boil. Irradiation is carried out while the mixture is refluxed for 2½ hours as described in Example 1. The solution is then extracted by shaking with ether. The ethereal extracts are washed with KHCO$_3$ and water, dried, and evaporated. The crude product is chromatographed over alumina of activity II. With a 1:1 mixture of benzene and ether, 312 mg. of crystals are eluated (melting point 175–180° C.). Recrystallization from a mixture of acetone and hexane yields 200 mg. of a product which melts at 208–210° C.

Analysis: $C_{21}H_{30}O_4$—Found 72.96%; 8.76% H.

I.R.: 3540, 1712, 1682, 1592 cm.$^{-1}$.

U.V.: 232m$\mu$/3.85.

$[\alpha]_D: +21°$.

EXAMPLE 5

117 mg. of the ketone-B described in Example 1 are dissolved in 2 ml. of a mixture of 10 ml. of glacial acetic acid and 1 ml. of 2 N-sulfuric acid and the solution heated on a water bath for 2 hours. Working up as described in Example 4 yields 116 mg. of crude oil. Chromatography over alumina of activity II gives in addition to some starting material about 16 mg. of a product which after recrystallization melts at 180–182° C. Its I.R. absorption spectrum is identical with that of the product of Example 4. When a saturated solution of the product is innoculated with high-melting crystals, the modification is obtained which melts at 208–210° C. and which according to mixed melting point, I.R. absorption, and specific rotation is identical with the product of Example 4. The resulting compound has the formula

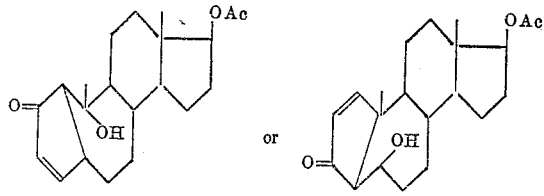

EXAMPLE 6

500 mg. of 1-dehydrotestosterone, dissolved in 50 ml. of methanol are irradiated for 90 minutes in the manner described in Example 1. The solvent is evaporated and the irradiation product chromatographed over alumina of activity II. With mixtures of petroleum ether and benzene about 350 mg. of crystals are obtained which on recrystallization from a mixture of acetone and hexane give 265 mg. of the 1-methyl-estradiol-17-acetate melting at 176–178° C.

EXAMPLE 7

300 mg. of 1-dehydro-4-methyl-testosterone are dissolved in 100 cc. of dioxane and the solution irradiated for one hour as described in Example 1. The solvent is evaporated and the residue chromatographed over alumina of activity I and a 70% yield of a single pentacyclic conversion product obtained which has the empirical formula $C_{20}H_{28}O_2$ and melts at 194–195° C. (after recrystallization from a mixture of acetone and hexane). It very likely has the formula

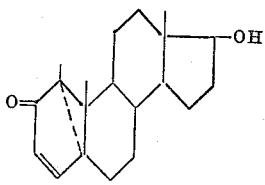

In the ultraviolet absorption spectrum it has a maximum at 244 m$\mu$ (log $\epsilon$ 3.55 and in the I.R. spectrum bands at 1690 cm.$^{-1}$ (strong) and at 1630 cm.$^{-1}$. (weak).

The acetate obtained in the usual manner from the irradiation product has the empirical formula $C_{22}H_{30}O_3$ and melts at 162–163° C. after being recrystallized from a mixture of acetone and hexane.

What is claimed is:

1. Process for the manufacture of new steroid compounds, wherein a $\Delta^{1,4}$-3-keto-steroid of the formula

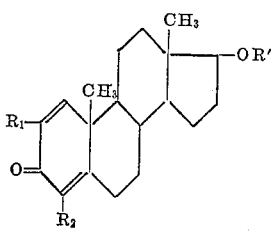

wherein one of the groups $R_1$ and $R_2$ stands for a member of the group consisting of hydrogen and methyl, and the other represents hydrogen, and R′ stands for a member selected from the group consisting of hydrogen and an acyl radical derived from a lower fatty acid is subjected to irradiation with ultraviolet light.

2. The new ultra-violet-light irradiation products prepared from a 1-dehydro-testosterone derivative of the formula

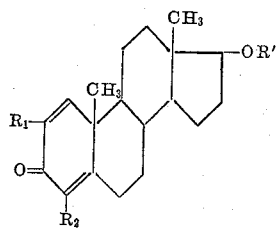

wherein one of the groups $R_1$ and $R_2$ stands for a member of the group consisting of hydrogen and methyl, and the other represents hydrogen and R′ stands for a member selected from the group consisting of hydrogen and of an acyl radical derived from a lower fatty acid by irradiation with ultraviolet light.

3. Ketone B of the empirical formula $C_{21}H_{28}O_3$, of melting point 161–162° C. and specific rotation $$[\alpha]_D = -145°$$

prepared from 1-dehydro-testosterone acetate by irradiation with ultraviolet light.

4. Ketone C of the empirical formula $C_{21}H_{28}O_3$, of melting point 161–162° C. and specific rotation $$[\alpha]_D = -141°$$

prepared from 1-dehydro-testosterone acetate by irradiation with ultraviolet light.

5. Ketone D of the empirical formula $C_{21}H_{28}O_3$, of melting point 174–175° C. and specific rotation $$[\alpha]_D = +296°$$

prepared from 1-dehydro-testosterone acetate by irradiation with ultraviolet light.

6. Ketone E of the empirical formula $C_{21}H_{28}O_3$, of melting point 157–158° C. and specific rotation $$[\alpha]_D = -15°$$

prepared from 1-dehydro-testosterone acetate by irradiation with ultraviolet light.

7. Ketone F of the empirical formula $C_{21}H_{28}O_3$, of melting point 174–175° C. and specific rotation $$[\alpha]_D = +319°$$

prepared from 1-dehydro-testosterone acetate by irradiation with ultraviolet light.

8. Ketone G of the empirical formula $C_{21}H_{28}O_3$, of melting point 148–149° C. and specific rotation $$[\alpha]_D = +256°$$

prepared from 1-dehydro-testosterone acetate by irradiation with ultraviolet light.

9. Phenol-J acetate of the empirical formula $C_{21}H_{28}O_3$, of melting point 170–171° C. and specific rotation $[\alpha]_D = +55°$, prepared from 1-dehydro-testosterone acetate by irradiation with ultraviolet light.

10. Phenol-J diacetate of the empirical formula $C_{23}H_{30}O_4$, of melting point 150–151° C. and specific rotation $[\alpha]_D = +54°$, prepared by acetylation of the compound claimed in claim 9.

11. Phenol K acetate of the empirical formula $C_{21}H_{28}O_3$, of melting point 203–204° C. and specific rotation $[\alpha]_D = +39°$, prepared from 1-dehydro-testosterone acetate by irradiation with ultraviolet light.

12. Phenol K diacetate of the empirical formula $C_{23}H_{30}O_4$, of melting point 141–142° C. and specific rotation $[\alpha]_D = +46°$, prepared by acetylation of the compound claimed in claim 11.

13. The ketone of the empirical formula $C_{20}H_{28}O_2$, of melting point 194–195° C., prepared from 1-dehydro-4-methyl-testosterone by irradiation with ultraviolet light.

14. The acetate of the compound of claim 13 of the empirical formula $C_{22}H_{30}O_3$, of melting point 162–163° C.

15. The ketone of the empirical formula $C_{21}H_{30}O_4$, the melting point 175–180° C., and the specific rotation $[\alpha]_D = +21°$, prepared from 1-dehydro-testosterone acetate by irradiation with ultraviolet light.

16. The ketone of the empirical formula $C_{21}H_{30}O_4$, the melting point 208–210° C. and the specific rotation $[\alpha]_D = +21°$, prepared from 1-dehydro-testosterone acetate by irradiation with ultraviolet light and recrystallized from a mixture of acetone and hexane.

No references cited.

UNITED STATES PATENT OFFICE
CERTIFICATE OF CORRECTION

Patent No. 3,013,027                                December 12, 1961

Leopold Ruzicka et al.

It is hereby certified that error appears in the above numbered patent requiring correction and that the said Letters Patent should read as corrected below.

Column 1, line 13, column 2, lines 44 and 56, and column 3, line 3, for "$\Delta^{1;4}$", each occurrence, read -- $\Delta^{1:4}$ --; column 2, Formula (XII) should appear as shown below instead of as in the patent:

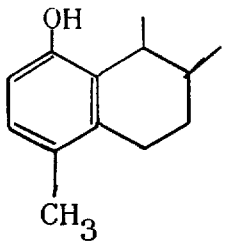

line 51, for "9α- 12α-" read -- 9α-, 12α- --; column 4, line 66, for "$[x]_D$" read -- $[\alpha]_D$ --; column 5, line 25, for "spiril" read -- spirit --; line 69, for "subjectedd" read -- subjected -- column 6, line 17, strike out "cm.$^{-1}$ (acetate), 1680 cm.$^{-1}$ and 1610 cm.$^{-1}$=the" and insert the same after "at 1731", in line 18, same column 6.

Signed and sealed this 6th day of November 1962.

(SEAL)
Attest:

ERNEST W. SWIDER                              DAVID L. LADD

Attesting Officer                             Commissioner of Patents